United States Patent
Peters et al.

(10) Patent No.: US 7,497,504 B2
(45) Date of Patent: Mar. 3, 2009

(54) SIDE-ON COLLISION BEAM FOR A MOTOR VEHICLE

(75) Inventors: Dirk Peters, Bestwig (DE); Meinhard Schwermann, Neuenrade-Affeln (DE)

(73) Assignee: Dura Automotive Body & Glass Systems GmbH, Plettenberg (DE)

( * ) Notice: Subject to any disclaimer, the term of this patent is extended or adjusted under 35 U.S.C. 154(b) by 58 days.

(21) Appl. No.: 11/386,034

(22) Filed: Mar. 20, 2006

(65) Prior Publication Data
US 2006/0208535 A1  Sep. 21, 2006

(30) Foreign Application Priority Data
Mar. 21, 2005 (DE) .............. 10 2005 012 981
Aug. 2, 2005 (DE) .............. 10 2005 036 292

(51) Int. Cl.
*B60N 27/00* (2006.01)
(52) U.S. Cl. ............... 296/187.12; 296/187.03; 296/146.6
(58) Field of Classification Search ........... 296/187.01, 296/187.03, 187.12, 146.6
See application file for complete search history.

(56) References Cited

U.S. PATENT DOCUMENTS

| 3,829,149 A | | 8/1974 | Stevens | |
| 4,978,562 A | | 12/1990 | Wycech | |
| 5,094,034 A | * | 3/1992 | Freeman | 296/187.12 |
| 5,124,186 A | * | 6/1992 | Wycech | 296/187.12 |
| 5,820,202 A | * | 10/1998 | Ju | 296/146.6 |
| 6,053,565 A | * | 4/2000 | Cho | 296/187.12 |
| 6,595,579 B2 | * | 7/2003 | Freitag et al. | 296/187.12 |

FOREIGN PATENT DOCUMENTS

| DE | 19605450 | 8/1996 |
| DE | 19756459 | 6/1999 |
| DE | 10112688 | 9/2002 |
| EP | 1004465 | 5/2000 |
| JP | 2001/246995 | 9/2001 |

OTHER PUBLICATIONS

European Patent Office, International Search Report of EP06004730, Nov. 4, 2008, 1 page.

* cited by examiner

*Primary Examiner*—Lori L Lyjak
(74) *Attorney, Agent, or Firm*—Alleman Hall McCoy Russell & Tuttle LLP

(57) ABSTRACT

A side impact beam for a motor vehicle comprising a beam part having a closed section and an insertion part provided in the beam part.

19 Claims, 3 Drawing Sheets

SIDE-ON COLLISION BEAM FOR A MOTOR VEHICLE

CROSS REFERENCE TO RELATED APPLICATIONS

This application claims priority to German Patent Application Serial No. 10 2005 012 981.1 filed Mar. 21, 2005, and German Patent Application Serial No. 10 2005 036 292.3 filed Aug. 2, 2005, each of which are hereby incorporated by reference in their entirety for all purposes.

FIELD

The present disclosure relates to a side-on collision beam, also termed a side impact beam, for a motor vehicle. The side-on collision beam comprises a beam part which has a closed section.

BACKGROUND AND SUMMARY

Side-on collision beams of this type are already known. They are used with side doors of motor vehicles. They can, however, also be used with other components of a motor vehicle, in particular with body components or gates, in particular tailgates, of motor vehicles. The beam part is preferably made of metal, in particular of steel. It has a hollow section. The section can also be approximately closed. In most cases, however, a completely closed section is advantageous or necessary for strength reasons.

EP 1 004 465 A2 discloses a side-on collision beam termed a ram protection beam there comprising a beam part which has a closed hollow section. The section comprises a compression flange and a tension flange which are connected to one another by lateral webs with a concave shape. The tension flange is made wider than the compression flange. The compression flange has a concave shape. On an impact, compressive forces are exerted onto the compression flange. As the deformation increases under the effect of these compressive forces, the bulging in the compression flange becomes larger and the lateral webs bulge increasingly inwardly. They ultimately assume a folded-together, concertina-like shape.

A similar impact beam for a motor vehicle door is known from DE 197 56 459 A1 in which the closed box section can be filled with a compressible filler material, for example with PU foam which does not completely fill up the box section in the normal state. However, the strength of the side impact beam cannot be increased or can only be increased slightly by a plastic foam of this type. The introduction of plastic foams is furthermore associated with substantial process costs.

The present disclosure provides an improved side impact beam.

According to one aspect, the improved side impact beam has a beam part and an insertion part provided in the beam part. A substantial increase in the strength of the side impact beam can hereby be achieved. The insertion part preferably has a lower strength than the beam part. The insertion part can be inserted into the beam part. It can, however, also be introduced into the beam part in another manner. In this process, the beam part can be manufactured first and the insertion part can be subsequently inserted or introduced in another manner. It is, however, also possible to manufacture the beam part and the insertion part simultaneously.

The insertion part can extend over the total length of the beam part. It can, however, also be advantageous for the insertion part to extend over a part region of the beam part. This part region is preferably disposed at the center of the beam part.

A further advantageous development is characterized in that the insertion part is not connected to the beam part in a shear-resistant manner. The connection is preferably of the type such that a relative movement is possible between the beam part and the insertion part in the event of a bending stress of the side impact beam.

The insertion part can be secured in position with respect to the beam part. In particular, the insertion part can be adhesively bonded to the beam part. The securing or adhesive bond can be designed in this process such that a relative movement is possible between the insertion part and the beam part in the event of a bending stress of the side impact beam.

The insertion part can completely fill the section of the beam part. It can, however, also be advantageous for the insertion part to only partly fill the section of the beam part.

The insertion part is preferably made of plastic. PA (polyamide) is particularly suitable. However, other plastics can also be used, for example PET.

A further advantageous development is characterized in that the insertion part can be made from non-reinforced plastic. The non-reinforced plastic in particular may be a plastic which has no glass fiber portion and/or no portion made of plastic foam.

It may be advantageous for the insertion part to be temperature-resistant. In particular, the insertion part is preferably made from a temperature-resistant plastic.

It may be advantageous that the beam part be made from steel. In such a case, it may be desirable for the steel to have a tensile strength of at least 800 $N/mm^2$. In specific applications, it may be advantageous for the steel to have a higher tensile strength, in particular a tensile strength of at least 1,000 $N/mm^2$.

A further advantageous development is characterized in that the beam part may be manufactured by roll forming. It is furthermore advantageous in specific cases for the beam part to be manufactured by welding, in particular by laser welding. Additionally, it may be desirable for the beam part to be manufactured by both roll forming and welding, in particular laser welding.

Additionally, the beam part may have a constant cross-section. In this case, but also when the beam part does not have a constant cross-section, it can be advantageous for the insertion part to have a constant cross-section. Ease of manufacture and other advantages may be obtained if the beam part and/or insertion part has a cross-section that is constant over the length of the part.

BRIEF DESCRIPTION OF THE FIGURES

Embodiments of the present disclosure will be explained in detail in the following with reference to the enclosed drawings. There are shown in the drawings.

DETAILED DESCRIPTION

Figure 1:
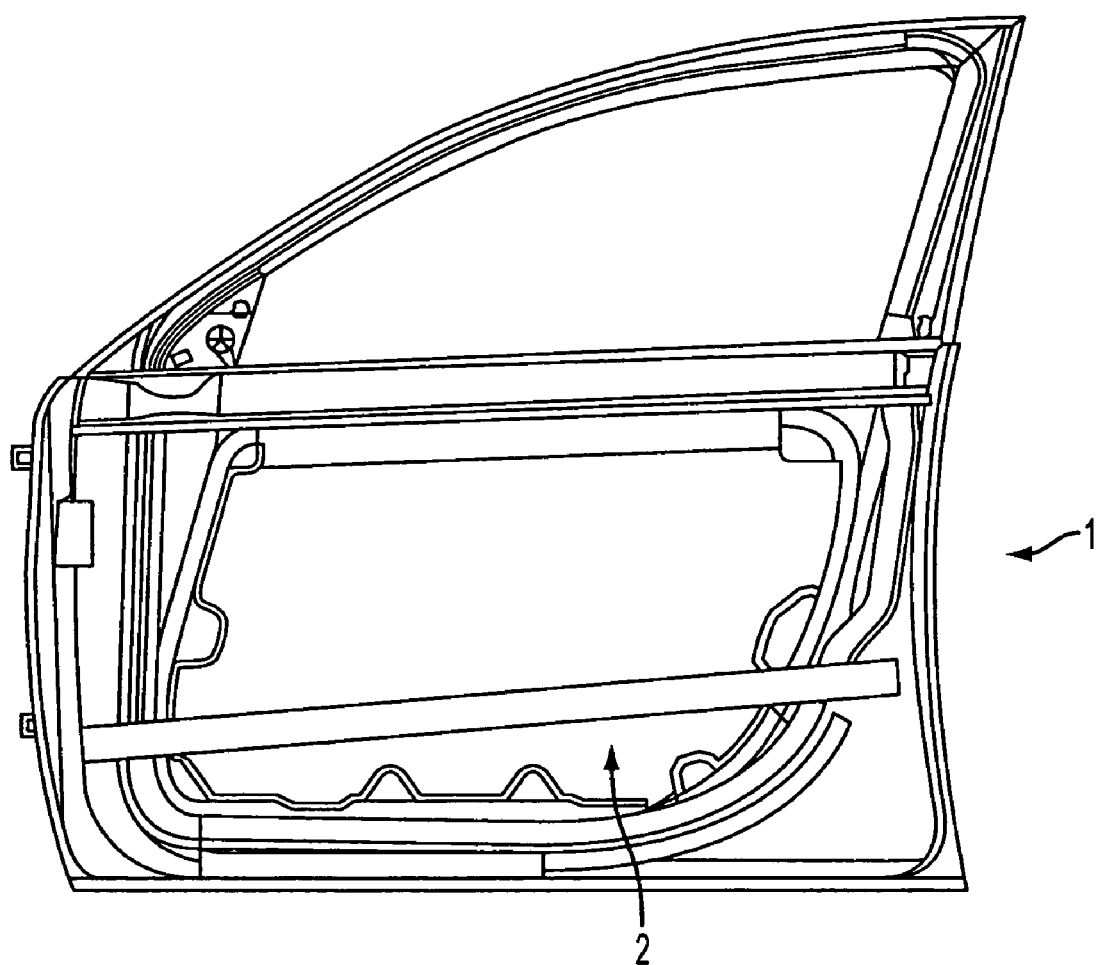
FIG. 1 shows an inside side view of a portion of a motor vehicle door.
Figure 2:
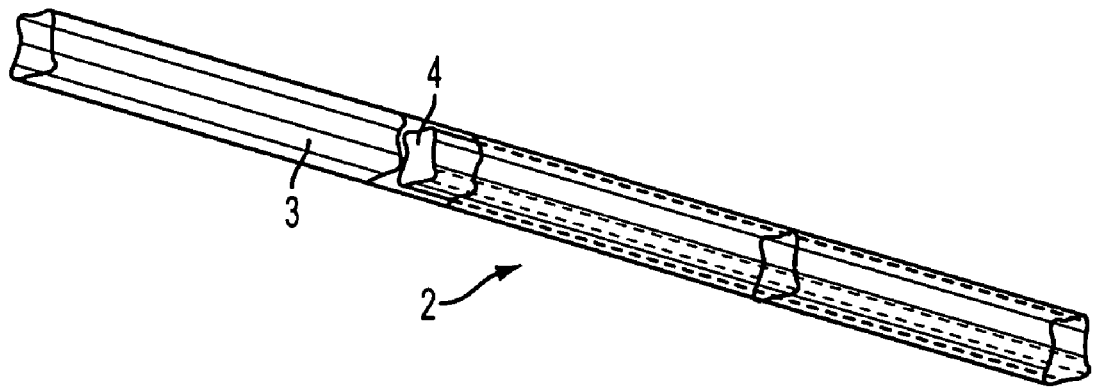
FIG. 2 shows a side impact beam in a perspective view.
Figure 3:
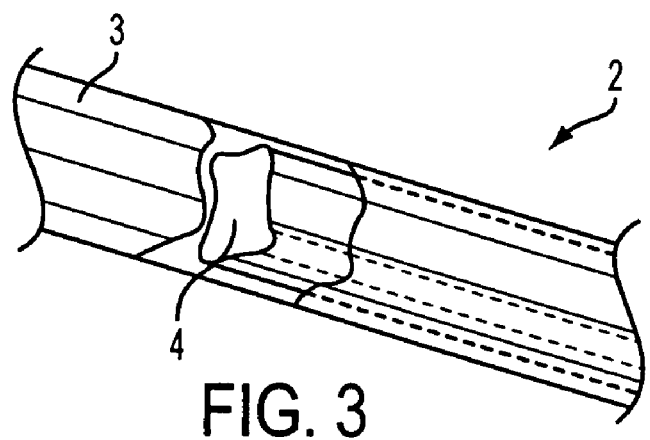
FIG. 3 shows an enlarged partial view of the side impact beam of FIG. 2.
Figure 4:
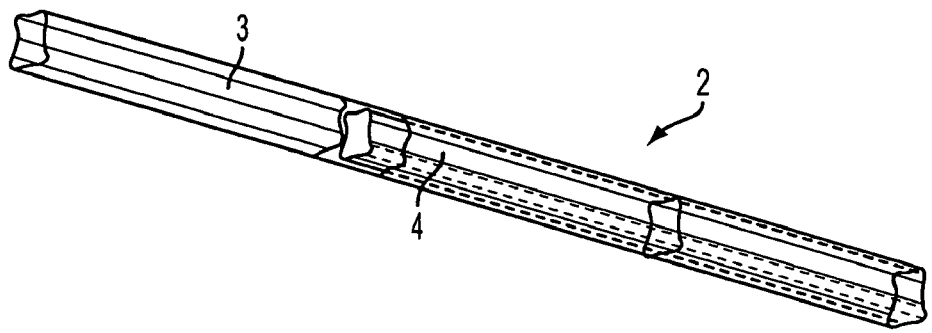
FIG. 4 shows the side impact beam in an enlarged perspective view.

The motor vehicle door carcass shown in FIG. 1 comprises a door box 1 in which a side impact beam 2 is provided which extends substantially in the longitudinal direction of the vehicle. The side impact beam 2 is provided in the lower region of the door box 1. It extends in a slightly rising manner from the front to the rear.

As can be seen from FIGS. 2 to 5, the side impact beam 2 comprises a beam part 3 which has a closed section and an insertion part 4 which is provided in the beam part 3. The beam part 3 is made from steel. Its section substantially corresponds to that of EP 1 004 465 A2. It consists of a compression flange 6 which is connected via lateral bow pieces to lateral webs 7, 8 which merge over further bow pieces into the tension flange 5. The compression flange 6 is planar in design. The tension flange 5 has a concave inwardly curved shape. The lateral webs 7, 8 are likewise concavely inwardly curved.

The insertion part 4 is made of plastic. It extends over a part region of the beam part 3, that is, at both sides of the center of this beam part 3. The length of the insertion part 4 amounts to approximately a quarter to a third of the length of the beam part 3.

Figure 5:
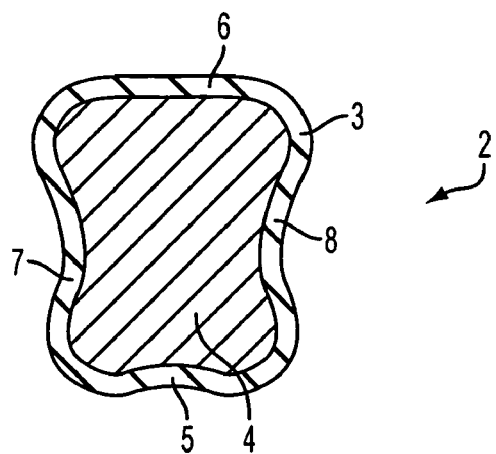
FIG. 5 shows a cross-sectional end view of an embodiment of the side impact beam.

The insertion part 4 furthermore completely fills the section of the beam part 3, as can in particular be seen from FIG. 5.

Figure 6:
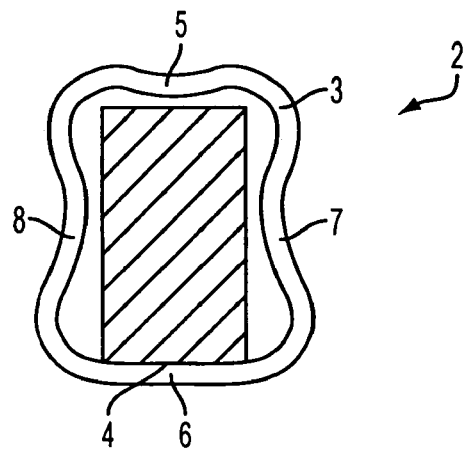
FIG. 6 shows a cross-sectional end view of an alternate embodiment of the side impact beam.

In the modified embodiment shown in FIG. 6, the section of the beam part 3 is only partly filled by the insertion part 4. The section of the beam part 3 substantially corresponds to that of the first embodiment of FIGS. 2 to 5. The insertion part 4 has a rectangular cross-section. It is connected, that is adhesively bonded, to the inner side of the compression flange 6 of the section of the beam part 3 at a narrow side. The oppositely disposed narrow side of the insertion part 3 has a slight spacing from the tension flange 5 of the section of the beam part 3. The lateral webs 7, 8 of the section of the beam part 3, which are inwardly concavely curved, are spaced apart from the longitudinal sides of the insertion part 4.

An improved side impact beam for motor vehicles is provided by the present disclosure. The insertion part can also be termed an inlay or a plastic inlay. The length of the insertion part can be fixed in relationship to the beam part in dependence on a specific demand of the specification. The insertion part is preferably positioned in the central region of the side impact beam. It can be secured to the beam part there with or without a shear connection. Depending on the desired design for the load demand, the specific type of material or type of plastic and the specific inlay geometry can be selected such that the specific load demand, in particular the force deflection behavior in the case of a crash, the total weight and/or the temperature resistance, is satisfied.

PA (polyamide) is particularly suitable as the plastic material for the insertion part since it satisfies particular demands with respect to tensile strength and temperature resistance. Generally, however, other plastics can also be used. It has been shown from test results that non-reinforced PA and PET provide good results.

It is prevented by the introduction of the insertion part into the originally empty section, for example made of high-strength steel such as Docol DP 1200, that premature component instabilities (kinking) and thus component failure in the form of cracking and subsequent breaking of the section or steel section occur with specific crash demands which are in particular based on US standard FMVSS 214. This unfavorable behavior occurs in particular with thin-walled, high-strength steels without an insertion part and is actually characteristic for them due to their relatively low break resistance in comparison with medium-strength or soft steels. On the other hand, high-strength steel with tensile strengths $\geq 1000$ MPa provides the large advantage in comparison with steels which are of a lower high strength of an initially very high force level shape and so of a high initial energy absorption in the case of a side impact in accordance with FMVSS 214 (quasi-static bending by a cylindrical die with a diameter of 300 or 305 mm in accordance with the specification demand of a number of OEMs). This is already ensured with low panel thicknesses by high-strength steels and therefore provides large advantages with respect to optimization of weight and costs.

If, instead of an insertion part, an attempt were made to prevent the component failure by an increase of the steel panel thickness, this would cancel out the named advantages in weight and costs, where it were at all possible, since the currently available panel thickness of high-strength steels is limited to thicknesses around 2 mm. It can be achieved by the present disclosure that the large advantages of high-strength steels of low panel thickness are not compromised by the disadvantage of premature material failure with low deformation paths.

The present disclosure is suitable for side impact beams and for other structural parts with predominantly bending strain. High-strength steels with a minimum tensile strength of 800 N/mm$^2$ are preferably used as the material for the beam part. It is advantageous in specific cases to use high-tensile steels with a higher minimum tensile strength, in particular with a minimum tensile strength of 1,000 N/mm$^2$. It is, however, also possible to manufacture the beam part from plastic. The beam part can be roll formed or welded, in particular laser welded. The beam part is preferably roll formed and welded, in particular laser welded.

The invention claimed is:

1. A side impact beam for a motor vehicle comprising a beam part having a closed section and an insertion part provided in the beam part, where the insertion part is connected to the beam part only at one side of the closed section of the beam part, and where the insertion part is otherwise spaced apart from the beam part, wherein the insertion part is not connected to the beam part in a shear-resistant manner.

2. The side impact beam according to claim 1, wherein the insertion part extends over an entire length of the beam part.

3. The side impact beam according to claim 1, wherein the insertion part extends over only a portion of a length of the beam part.

4. The side impact beam according to claim 1, wherein the insertion part is secured in position relative to the beam part.

5. The side impact beam according to claim 1, wherein the insertion part has a cross-section that completely fills a cross-section of the beam part.

6. The side impact beam according to claim 1, wherein the insertion part has a cross-section that only partially fills a cross-section of the beam part.

7. The side impact beam according to claim 1, wherein the insertion part is made of plastic.

8. The side impact beam according to claim 7, wherein the insertion part is made of polyamide.

9. The side impact beam according to claim 1, wherein the insertion part is made of non-reinforced plastic.

10. The side impact beam according to claim 1, wherein the insertion part is temperature resistant.

11. The side impact beam according to claim 1, wherein the beam part is made of metal.

12. The side impact beam according to claim 11, wherein the beam part is made of steel.

13. The side impact beam according to claim 12, wherein the beam part is made of a steel having a tensile strength of at least 800 N/mm$^2$.

14. The side impact beam according to claim 1, wherein the beam part is manufactured by roll forming and by welding.

15. The side impact beam according to claim 14, wherein the beam part is manufactured by laser welding.

16. The side impact beam according to claim 1, wherein the beam part has a constant cross-section.

17. The side impact beam according to claim 1, wherein the insertion part has a constant cross-section.

18. A side impact beam for a motor vehicle, comprising:
- an elongate beam member having an at least partially hollow interior; and
- an insertion member disposed within the at least partially hollow interior, wherein the insertion member is connected to the elongate beam member only at one side of the partially hollow interior of the elongate beam member, and where the insertion member is spaced apart from the elongate beam member, wherein the beam is arranged in a door of the motor vehicle and extends substantially in a longitudinal direction of the vehicle, and where the insertion member is made of plastic and adhesively bonded to the elongate beam member.

19. A side impact beam for a motor vehicle comprising a beam part having a closed section and an insertion part provided in the beam part, where the insertion part is connected to the beam part only at one side of the closed section of the beam part, and where the insertion part is otherwise spaced apart from the beam part, wherein the insertion part has a cross-section that completely fills a cross-section of the beam part.

* * * * *